Figure 1:
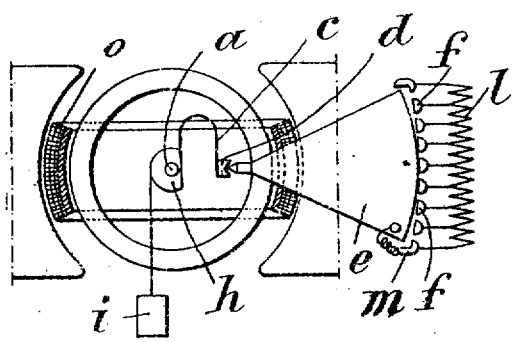

H. GÜTTINGER.
REGULATION OF DYNAMO ELECTRIC MACHINERY.
APPLICATION FILED JAN. 16, 1909.

1,003,600.

Patented Sept. 19, 1911.

Witnesses:
Jesse N. Sutton
R. M. Sommers

Inventor:
Heinrich Güttinger
by Henry Orth Jr.
atty.

UNITED STATES PATENT OFFICE.

HEINRICH GÜTTINGER, OF BADEN, SWITZERLAND, ASSIGNOR TO THE FIRM OF AKTIENGESELLSCHAFT BROWN, BOVERI & CIE., OF BADEN, SWITZERLAND.

REGULATION OF DYNAMO-ELECTRIC MACHINERY.

1,003,600.      Specification of Letters Patent.      Patented Sept. 19, 1911.

Application filed January 16, 1909. Serial No. 472,620.

*To all whom it may concern:*

Be it known that I, HEINRICH GÜTTINGER, engineer, a citizen of the Republic of Switzerland, residing at "Zum Rosenheim," Bruggerstrasse, Baden, Switzerland, have invented certain new and useful Improvements in and Relating to the Regulation of Dynamo-Electric Machinery and the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the automatic regulation of dynamo-electric machinery and has for its object to provide means for the automatic regulation of such machinery—such term including direct current and alternating current systems, transformers, and other arrangements or apparatus in which current, voltage or both is or are required to regulate or to be regulated—which means, in contradistinction to the devices of this type in use hitherto permits the regulation of such machinery by altering a resistance without the use of a special auxiliary power or agent such as for instance of a motor which is necessary with the Thury regulator and without the occurrence of detrimental sparking as is the case, for instance, with the Tirill regulator.

The invention consists in a relay arrangement which may be operated by alternating current or direct current adapted to move, under the influence of the current or pressure to be regulated or of both, the point of a rolling sector thus rolling off the circumference of this sector on contact buttons of the resistance, regulating the current or pressure of the machine, or both, which buttons are arranged in a circle having a large radius. The adjustment of this resistance is effected without the occurrence of sliding friction so that the direct or immediate adjustment of the regulating resistance may be effected by means of the power developed in the relay with the utmost accuracy and reliability. Further the regulating device forming the subject matter of this invention has the great advantage over known devices that in the state of equilibrium all parts of the system are at rest, consequently reducing the wear of the movable parts to a minimum. Any suitable means such as spring gravity, electrical and the like may be used as controls for adjusting the relay.

The invention also consists in the arrangements hereinafter described.

Figure 3:
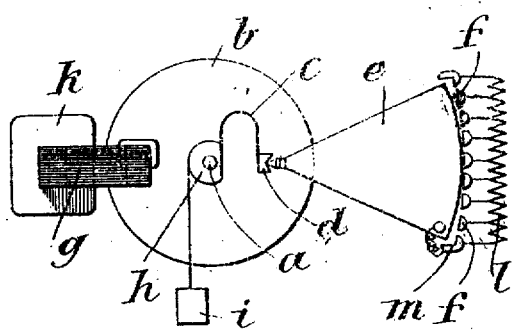
Figure 4:
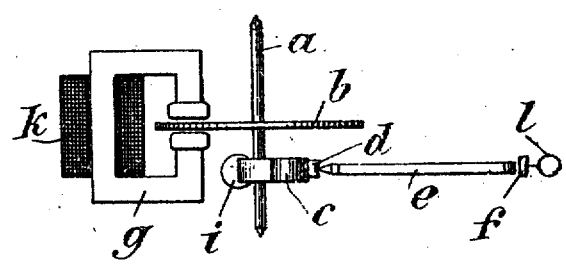

Referring to the accompanying partly sectional drawings: Figure 1 is a front elevation and Fig. 2 a plan view of one form of regulating device according to this invention. Figs. 3 and 4 show in front elevation and plan view respectively a modified form suitable for use with alternating currents.

Figure 2:
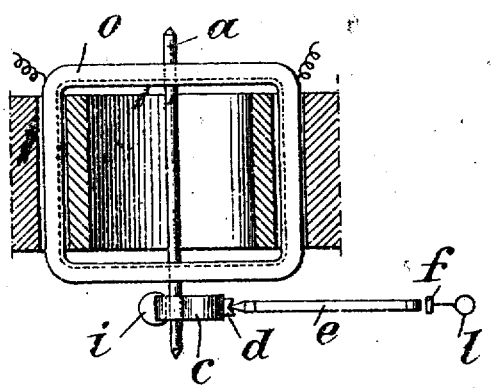

In carrying the invention into effect in the form illustrated in Figs. 1 and 2 which is suitable for use with direct currents, a moving coil $o$ suitably fastened to a ring $o'$ is mounted on a spindle $a$, together with a spring $c$, which carries the point bearing $d$. A rolling sector $e$ is pressed by the spring $c$ against the contacts $f$, which are stationarily mounted around the center of the spindle $a$. In addition a lever is mounted on the shaft $a$, which in this form of the invention is shown as a disk $h$, which carries at the same time the spring $c$.

In operation if for instance a direct current flow in the turning coil $o$ and a uniformly saturated magnetic field cut it after the manner of Weston's instrument, which current has such an intensity that the developed torque counterbalances the torque produced by the weight, $i$, the coil will adjust itself to a definite position. A slight increase in the tensity of current or terminal pressure will then result in a turning movement in say a clockwise direction while a decrease will result in a turning movement in a counter-clockwise direction. If the moving coil be connected across the leads of a shunt dynamo and so operate according to voltage or pressure and if the resistance $l$, be placed in the field circuit then as the rolling sector $e$ is electrically connected with the one end $m$ of the resistance a rotation in one direction will result in an increase in the terminal pressure while a decrease of pressure will take place by rotation in the other direction introducing resistance in the field circuit for such a period until the torques acting in opposite directions on the moving coil $o$ are equal to each other.

In carrying the invention into effect in the form illustrated in Figs. 3 and 4 applied by way of example in an alternating current system a disk $b$, constructed of aluminium or the like is arranged for driving according to Ferrari's principle by an alternating current electro-magnet $g$. The winding $h$ of this magnet may be taken as connected in the present instance to the terminals of an alternating current generator, while the resistance $l$, may be situate in the main current circuit or in the shunt current circuit of the exciting dynamo. The mode of action is similar in this instance to that in the case with direct current referred to above.

In order to make the contacts of the resistance, which should be protected from dust as durable as possible, their surfaces are preferably silvered.

When using only one rolling sector the weight of the same should be balanced by a counterweight. In place of the latter and to counterbalance the unbalanced radially acting force of the spring $c$, one of several such sectors may be arranged symmetrically around the center of the axis or shaft. The weight $i$, may also if desired be substituted by suitable spring means.

Having now particularly described and ascertained the nature of the said invention and in what manner the same is to be performed, I declare that what I claim is:

1. In an automatic electric regulator, a set of contacts and resistances connecting them, an operating sector adapted to roll over said contacts, a shaft, an electrically controlled rotatable member mounted thereon and elastic means connected to said shaft and transmitting the movement of said rotatable member to the point of said sector.

2. In an automatic electric regulator, a set of contacts and resistances connecting them, an operating sector adapted to roll over said contacts, a shaft, an electrically controlled rotatable member mounted on said shaft and a spring connected to said shaft and transmitting the movement of the rotatable member to the point of said sector.

3. In an automatic electric regulator, a set of contacts and resistances connecting them, an operating sector adapted to roll over said contacts, a shaft, an electrically controlled rotatable member mounted on said shaft and a point bearing connected to said shaft and a point on said sector engaging said bearing.

4. In an automatic electric regulator, a set of contacts and resistances connecting them, an operating sector adapted to roll over said contacts, a shaft, an electrically controlled rotatable member mounted on said shaft and a spring connected to said shaft and provided with a point bearing, and a bearing point fastened to said sector and engaging the said bearing.

5. In an automatic electric regulator, a set of contacts and resistances connecting them, an operating sector adapted to roll over said contacts, a shaft, an electrically controlled rotatable member mounted on said shaft and a spring connected to said shaft and provided with one member of a point bearing the other member of which is fastened to the point of said sector, the distance of said point bearing from the axis of the shaft being small compared to the radius of the sector.

6. In an automatic electric regulator, a set of contacts arranged in an arc and resistances connecting them, an operating sector adapted to roll over said contacts, said sector of greater curvature than the arc in which the contacts are arranged, a shaft, an electrically controlled rotatable member mounted on said shaft and a spring connected to said shaft and provided with one member of a point bearing the other member of which is fastened to the point of said sector.

7. In an automatic electric regulator, a set of contacts arranged in an arc and resistances connecting them, an operating sector adapted to roll over said contacts, said sector of greater curvature than the arc in which the contacts are arranged, a shaft, an electrically controlled rotatable member mounted on said shaft, a spring connected to said shaft and provided with one member of a point bearing the other member of which is fastened to the point of said sector, said spring urging the sector against the contacts.

8. In an automatic electric regulator, a set of contacts and resistances connecting them, an operating sector adapted to roll over said contacts, a shaft, an electrically controlled rotatable member mounted on said shaft, a weight to counterbalance said member against rotation, a spring connected to said shaft and provided with one member of a point bearing the other member of which is fastened to the point of said sector.

9. In an automatic electric regulator, a set of contacts arranged in an arc and resistances connecting them, an operating sector adapted to roll over said contacts, said sector of greater curvature than the arc in which the contacts are arranged, a shaft, an electrically controlled rotatable member mounted on said shaft, a lever arm on the shaft, a weight suspended from the lever arm to counterbalance said rotatable member and prevent its rotation under normal conditions, and a spring connected to said shaft and provided with one member of a point bearing the other member of which is fastened to the point of said sector, said spring urging the sector against the contacts.

10. In an automatic electric regulator, a set of contacts arranged in an arc and resistances connecting them, an operating sector adapted to roll over said contacts, said sector of greater curvature than the arc in which the contacts are arranged, a shaft, a disk on the shaft acting as a lever, a motor, a weight and a flexible suspension for the weight connected to the disk to prevent the rotation of the motor under normal conditions and a spring connected to said shaft and provided with one member of a point bearing the other member of which is fastened to the point of said sector, said spring urging the sector against the contacts.

In testimony that I claim the foregoing as my invention, I have signed my name in presence of two subscribing witnesses.

HEINRICH GÜTTINGER.

Witnesses:
ERNST FISCHER,
JOSEPH SIMON.